(12) United States Patent
Jeong et al.

(10) Patent No.: US 12,010,738 B2
(45) Date of Patent: Jun. 11, 2024

(54) METHOD AND APPARATUS FOR ENHANCING RELIABILITY IN WIRELESS COMMUNICATION SYSTEMS

(71) Applicant: Samsung Electronics Co., Ltd., Suwon-si (KR)

(72) Inventors: Sangsoo Jeong, Suwon-si (KR); Taesung Jung, Suwon-si (KR); Varini Gupta, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 278 days.

(21) Appl. No.: 17/444,823

(22) Filed: Aug. 10, 2021

(65) Prior Publication Data

US 2022/0046729 A1    Feb. 10, 2022

(30) Foreign Application Priority Data

Aug. 10, 2020  (KR) .................. 10-2020-0100144

(51) Int. Cl.
  *H04W 36/00* (2009.01)
  *H04L 67/306* (2022.01)
  *H04W 76/10* (2018.01)
  *H04W 76/38* (2018.01)

(52) U.S. Cl.
  CPC ........... *H04W 76/10* (2018.02); *H04L 67/306* (2013.01); *H04W 76/38* (2018.02)

(58) Field of Classification Search
  CPC .... H04W 76/10; H04W 24/04; H04L 67/306; H04L 41/0895; H04L 41/0894; H04L 41/0836; H04L 41/06; H04L 41/0813; H04L 67/14; H04L 67/30
  See application file for complete search history.

(56) References Cited

U.S. PATENT DOCUMENTS

| | | | |
|---|---|---|---|
| 2020/0374946 A1* | 11/2020 | Bedekar | H04W 92/04 |
| 2021/0289566 A1* | 9/2021 | Jimenez Cordon | H04L 63/1458 |
| 2022/0182896 A1* | 6/2022 | Talebi Fard | H04W 36/0085 |
| 2022/0408333 A1* | 12/2022 | Ryu | H04L 67/146 |

FOREIGN PATENT DOCUMENTS

| KR | 10-2021-0031297 A | 3/2021 |
|---|---|---|
| WO | 2020229409 A1 | 11/2020 |

OTHER PUBLICATIONS

3GPP TSG-CT4 Meeting#94, Portoroz, Slovenia, Oct. 7, 2019; C4-194294 (Year: 2019).*

International Search Report and Written Opinion of the International Searching Authority dated Nov. 22, 2021, in connection with International Application No. PCT/KR2021/010584, 8 pages.

(Continued)

*Primary Examiner* — Lan-Huong Truong

(57) ABSTRACT

Provided is a method and apparatus for enhancing the reliability in a wireless communication system. An operating method of a user plane function (UPF) in a wireless communication system includes: receiving network function (NF) set related information changed through an association procedure with respect to an NF; changing a profile of the NF, based on the received NF set related information; and performing an operation related to the NF, based on the changed profile.

18 Claims, 9 Drawing Sheets

(56) References Cited

OTHER PUBLICATIONS

3GPP TS 23.501 V16.5.1 (Aug. 2020), Technical Specification, 3rd Generation Partnership Project; Technical Specification Group Services and System Aspects; System architecture for the 5G System (5GS); Stage 2 (Release 16), Aug. 2020, 440 pages.
Ericsson, "UPF ID," C4-200950 was C4-200511, 3GPP TSG-CT WG4 Meeting #96 E-Meeting, Feb. 17-28, 2020, 18 pages.
Ericsson, "Corrections for CN tunnel info allocation and release," S2-2002427 (Revision of S2-2002024), 3GPP TSG SA WG2 Meeting #137E, Electronic Meeting, Feb. 24-27, 2020, 38 pages.
Huawei et al., "Reflective QoS," S2-2003865 (revision of S2-2002751), 3GPP TSG-WG SA2 Meeting #139E e-meeting, Elbonia, Jun. 1-5, 2020, 6 pages.
Oracle Corporation, "Simplify NF Set ID and NF Service Set ID Format," C4-194294, 3GPP TSG-CT4 Meeting #94, Portoroz, Slovenia, Oct. 7-11, 2019, 4 pages.
Supplementary European Search Report dated Dec. 6, 2023, in connection with European Patent Application No. 21856194.2, 16 pages.
Samsung, "SMF-Set ID in PFCP Association Messages," 3GPP TSG-CT WG4 Meeting #99e, C4-204288, E-Meeting, Aug. 2020, 8 pages.
3GPP TS 23.527 V16.3.0 (Jun. 2020) Technical Specification; 3rd Generation Partnership Project; Technical Specification Group Core Network and Terminals; 5G System; Restoration Procedures (Release 16); Jun. 2020, 23 pages.
3GPP TS 29.244 V16.4.0 (Jun. 2020) Technical Specification; 3rd Generation Partnership Project; Technical Specification Group Core Network and Terminals; Interface between the Control Plane and the User Plane Nodes; Stage 3 (Release 16); Jun. 2020, 310 pages.
3GPP TS 23.502 V16.5.1 (Aug. 2020) Technical Specification; 3rd Generation Partnership Project; Technical Specification Group Services and System Aspects; Procedures for the 5G System (5GS); Stage 2 (Release 16); Aug. 2020, 594 pages.

* cited by examiner

METHOD AND APPARATUS FOR ENHANCING RELIABILITY IN WIRELESS COMMUNICATION SYSTEMS

CROSS-REFERENCE TO RELATED APPLICATION

This application is based on and claims priority under 35 U.S.C. § 119 to Korean Patent Application No. 10-2020-0100144, filed on Aug. 10, 2020, in the Korean Intellectual Property Office, the disclosure of which is incorporated by reference herein in its entirety.

BACKGROUND

1. Field

The disclosure relates to a method and apparatus for enhancing reliability in a wireless communication system.

2. Description of the Related Art

To meet the increase in demand with respect to wireless data traffic after the commercialization of $4^{th}$ Generation (4G) communication systems, considerable efforts have been made to develop improved $5^{th}$ Generation (5G) communication systems or pre-5G communication systems. For this reason, 5G communication systems or pre-5G communication systems are called beyond 4G network communication systems or post Long Term Evolution (LTE) systems.

To achieve a high data rate, the implementation of 5G communication systems in an ultra-high frequency band (millimeter wave (mmWave)) (e.g., a 60 GHz band) is under consideration. To reduce propagation loss of radio waves and to increase a transmission range of radio waves in the ultra-frequency bands, beamforming, massive multiple-input multiple-output (MIMO), full dimensional MIMO (FD-MIMO), array antenna, analog beamforming, and large-scale antenna techniques are under discussion.

Also, in order to improve a system network for 5G communication systems, technologies, such as evolved small cell, advanced small cell, cloud radio access network (cloud RAN), ultra-dense network, Device-to-Device (D2D) communication, wireless backhaul, moving network, cooperative communication, Coordinated Multi-Points (CoMP), and reception interference cancellation, are being developed.

In addition, in the 5G system, an advanced coding modulation (ACM), e.g., Hybrid FSK and QAM Modulation (FQAM), sliding window superposition coding (SWSC), and an advanced access technology, e.g., filter bank multi carrier (FBMC), non-orthogonal multiple access (NOMA), sparse code multiple access (SCMA) are being developed.

Meanwhile, the Internet has evolved from a human-centered connection network, through which humans generate and consume information, to an Internet of Things (IoT) network that exchanges and processes information between distributed elements such as objects. Internet of Everything (IoE) technology has emerged, in which the IoT technology is combined with, for example, technology for processing big data through connection with a cloud server. In order to implement the IoT, various technical components are required, such as a sensing technique, wired/wireless communication and network infrastructures, a service interfacing technique, a security technique, and the like. In recent years, techniques including a sensor network for connecting objects, Machine-to-Machine (M2M) communication, Machine Type Communication (MTC), etc., have been studied. In the IoT environment, intelligent Internet Technology (IT) services may be provided to collect and interpret data obtained from objects connected to each other, and to create new value in human life. As existing information technology (IT) techniques and various industries converge and combine with each other, the IoT may be applied to various fields, such as smart homes, smart buildings, smart cities, smart cars or connected cars, smart grids, health care, smart home appliances, high quality medical services, and the like.

Various attempts are being made to apply 5G communication systems to IoT networks. For example, technologies regarding a sensor network, M2M communication, MTC, etc., are implemented by the 5G communication technologies, such as beamforming, MIMO, array antenna schemes, etc. The application of cloud RAN as the big data processing technology described above may be an example of convergence of 5G communication technology and IoT technology.

With the development of various information technologies (IT), network equipments have evolved into virtualized network functions (NFs) (hereinafter interchangeably used with "a network element") by applying virtualization technology thereto, such that the virtualized NFs are implemented in a software form beyond physical limitations and may be initiated/operated in various types of clouds or data centers (DCs). In particular, an NF may be freely scaled up or down, initiated or terminated according to service requirements, system capacity, and network load. Even when these NFs are implemented in the form of software, it should be noted that the physical configuration is not excluded because the NFs have to be basically run on a physical configuration, for example, a device. In addition, NFs may be implemented with a simple physical configuration, that is, only as hardware.

In order to support various services in these various network structures, network slicing technology has been introduced. Network slicing is a technology for logically constructing a network as a set of NFs to support a specific service and separating it from other slices. One terminal may access two or more slices when the terminal receives various services.

SUMMARY

Provided are a method and apparatus for enhancing reliability in a wireless communication system.

Additional aspects will be set forth in part in the description which follows and, in part, will be apparent from the description, or may be learned by practice of the presented embodiments of the disclosure.

According to an embodiment of the disclosure, an operating method of a user plane function (UPF) in a wireless communication system includes receiving network function (NF) set related information changed through an association procedure with respect to an NF, changing a profile of the NF, based on the received NF set related information, and performing an operation related to the NF, based on the changed profile.

According to another embodiment of the disclosure, a user plane function (UPF) of a wireless communication system includes a transceiver, a memory, and a processor configured to control such that NF (network function) related information changed through an association procedure with respect to an NF is received, that a profile of the NF is changed based on the received NF set related information, and that an operation related to the NF is performed based on the changed profile to be performed.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
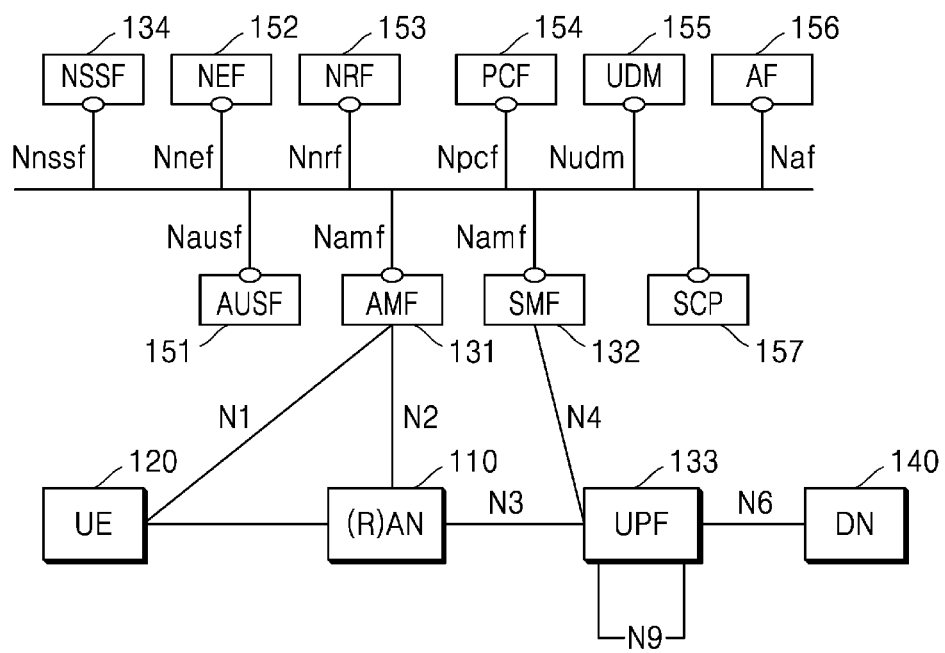
FIG. 1 is a diagram illustrating a wireless communication system according to various embodiments of the disclosure.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Throughout the disclosure, the expression "at least one of a, b or c" indicates only a, only b, only c, both a and b, both a and c, both b and c, all of a, b, and c, or variations thereof.

Examples of a terminal may include user equipment (UE), a mobile station (MS), a cellular phone, a smartphone, a computer, a multimedia system capable of performing a communication function, or the like.

In the disclosure, a controller may be referred to as a processor.

In the disclosure, a layer (or a layer apparatus) may also be referred to as an entity.

Terms used in the disclosure are used only to describe specific embodiments, and may not be intended to limit the scope of other embodiments. The singular expressions may include plural expressions unless the context clearly indicates otherwise. Terms used herein, including technical or scientific terms, may have the same meanings as commonly understood by one of ordinary skill in the art described in the disclosure. Among the terms used in the disclosure, the terms defined in the general dictionary may be interpreted as the same or similar meaning as the meaning in the context of the related art, and are not to be construed in an ideal or excessively formal meaning unless explicitly defined in the disclosure. In some cases, even terms defined in the disclosure cannot be construed to exclude embodiments of the disclosure.

In various embodiments of the disclosure described below, a hardware access method will be described as an example. However, because various embodiments of the disclosure include technology using both hardware and software, various embodiments of the disclosure do not exclude a software-based approach.

Hereinafter, preferred embodiments of the disclosure will be described in detail with reference to the accompanying drawings. In this case, it should be noted that in the accompanying drawings, the same components are denoted by the same reference numerals as much as possible. In addition, detailed descriptions of well-known functions and configurations that may obscure the gist of the disclosure will be omitted.

In describing the embodiments of the disclosure, descriptions of technical contents that are well known in the technical field to which the disclosure belongs and are not directly related to the disclosure will be omitted. This is to more clearly convey the gist of the disclosure by omitting unnecessary description.

For the same reason, some components are exaggerated, omitted, or schematically illustrated in the accompanying drawings. In addition, the size of each component does not fully reflect the actual size. In each figure, the same or corresponding elements are assigned the same reference numerals.

Advantages and features of one or more embodiments of the disclosure and methods of accomplishing the same may be understood more readily by referring to the following detailed description of the embodiments of the disclosure and the accompanying drawings. The disclosure may, however, be embodied in many different forms and should not be construed as limited to embodiments set forth herein; rather these embodiments are provided so that this disclosure will be thorough and complete, and will fully convey the scope of the disclosure only defined by the claims to one of ordinary skill in the art. The same reference numerals refer to the same elements throughout the disclosure.

In this case, it will be understood that each block of process flowcharts and combinations of the flowcharts may be performed by computer program instructions. Because these computer program instructions may be embedded in a processor of a general-purpose computer, a special-purpose computer, or other programmable data processing apparatuses, the instructions executed through the processor of the computer or other programmable data processing apparatus generates modules for performing the functions described in the flowchart block(s). Because these computer program instructions may also be stored in a computer-executable or computer-readable memory that may direct the computer or other programmable data processing apparatus so as to implement functions in a particular manner, the instructions stored in the computer-executable or computer-readable memory are also capable of producing an article of manufacture containing instruction modules for performing the functions described in the flowchart block(s). Because the computer program instructions may also be embedded into the computer or other programmable data processing apparatus, the instructions for executing the computer or other programmable data processing apparatuses by generating a computer-implemented process by performing a series of operations on the computer or other programmable data processing apparatuses may provide operations for executing the functions described in the flowchart block(s).

Also, each block may represent part of a module, segment, or code that includes one or more executable instructions for executing a specified logical function(s). It should also be noted that, in some alternative implementations, the functions described in the blocks may occur out of the order noted in the drawings. For example, two blocks illustrated in succession may in fact be executed substantially concurrently, or the blocks may sometimes be executed in a reverse order, depending on the functions involved therein.

The term "-unit", as used in the present embodiment of the disclosure refers to a software or hardware component, such as field-programmable gate array (FPGA) or application-specific integrated circuit (ASIC), which performs certain tasks. However, the term "module" or "-er/or" is not limited to software or hardware. The term "module" or "-er/or" may be configured in an addressable storage medium or may be configured to reproduce one or more processors. Therefore, for example, the term "module" or "-er/or" includes elements, such as software elements, object-oriented software elements, class elements, and task elements, processes, functions, attributes, procedures, subroutines, segments of program code, drivers, firmware, microcodes, circuits, data, databases, data structures, tables, arrays, and variables. Functions provided in the elements and the "modules" or "-ers/ors" may be combined with fewer elements and "modules" or "-ers/ors", or may be separated from additional elements and "modules" or "-ers/ors." Furthermore, the elements and the "modules" or "-ers/ors" may be implemented to reproduce one or more central processing units (CPUs) in the device or secure multimedia card.

The disclosure relates to a method and apparatus for supporting various services in a wireless communication system. For example, in the disclosure, a technology for supporting various services by supporting mobility of a UE in a wireless communication system is described.

Herein, terms to identify access nodes, terms to refer to network entities or network functions (NFs), terms to refer to messages, terms to refer to interfaces between network entities, terms to refer to various types of identification information, etc., are examples for convenience of explanation. Therefore, the disclosure is not limited to the terms to be described later, and other terms referring to entities having an equivalent technical meaning may be used.

For convenience of explanation, the disclosure will hereinafter use terms and definitions defined by the 3GPP LTE and 5G standards. However, the disclosure is not limited by the terms and names and may be equally applied to systems conforming to other standards.

Entities that exchange information for access control and status management will now be collectively called "NFs" for convenience of explanation. For example, the NF may be at least one of an access and mobility management function (hereinafter referred to as an AMF) apparatus, a session management function (hereinafter referred to as an SMF) apparatus, or a network slice selection function (hereinafter referred to as an NSSF) apparatus. Embodiments of the disclosure may, however, be equally applied to an occasion when the NF is implemented as an instance, e.g., an AMF instance, an SMF instance, an NSSF instance, etc.

In the disclosure, in an instance, an NF may be present in the form of a software code, and may be executable by receiving physical and/or logical resources from a physical computing system, for example, a computing system present on a core network, to perform a function of the NF in the computing system. All NF instances, such as an AMF instance, an SMF instance, or the like, may refer to instances that may be used by receiving physical and/or logical resources for an NF operation from a computing system present on a core network. As a result, an NF instance in a case where a physical NF apparatus, such as an AMF, SMF, or the like, is present and an NF instance that receives and uses physical and/or logical resources for an NF operation from a computing system present on a network may perform the same operation.

FIG. 1 illustrates a wireless communication system according to various embodiments of the disclosure.

Referring to FIG. 1, a radio access node (RAN) 110 and a user equipment (UE) 120 are shown as a part of nodes using a radio channel in a wireless communication system. Although there is one RAN 110 and one UE 120 shown in FIG. 1, another RAN, which is identical or similar to the RAN 110, may be further included. Furthermore, FIG. 1 is focused on an occasion when the single UE 120 performs communication with the single RAN 110. It is, however, obvious that there may be actually a plurality of UEs communicating with the single RAN 110.

The RAN 110 includes a network infrastructure that provides a radio access to the UE 120. The RAN 110 may have a coverage defined to be a certain geographic area based on a range within which a signal may be transmitted from the RAN 110. In addition to a base station, the RAN 110 may be referred to as an access point (AP), an eNodeB (eNB), a gNodeB (gNB), a $5^{th}$ generation (5G) node, a wireless point, a transmission/reception point (TRP), or other terms having an equivalent technical meaning.

The UE 120 is an apparatus used by a user, and performs communication with the RAN 110 through a radio channel. In some cases, the UE 120 may be operated without intervention of the user. For example, the UE 120 is an apparatus for performing machine type communication (MTC), which may not be carried by the user. The UE 120 shown in FIG. 1 may include at least one user portable apparatus, which may also include at least one MTC. The UE 120 may be referred to as a terminal, a mobile station, a subscriber station, a remote terminal, a wireless terminal, a user equipment, a user device, or other terms having an equal technical meaning.

The AMF 131 may include a network entity for managing wireless network access and mobility. The SMF 132 may include a network entity that manages access of a packet data network for providing packet data to the UE 120. The UE 120 and the SMF 132 may be connected to each other through a packet data unit (PDU) session.

A user plane function (UPF) 133 may include a gateway that delivers packets transmitted and received by the UE 120, or may serve as the gateway. The UPF 133 may be connected to a data network (DN) 140 via the Internet to provide a path between the UE 120 and the DN 140 for data transmission or reception. Accordingly, the UPF 133 may route data to be delivered to the Internet from among the packets transmitted by the UE 120 to an Internet data network.

A network slice selection function (NSSF) 134 may include a network entity that performs a network selection operation described herein, for example, an operation of selecting a network slice. An operation of the NSSF 134 will be described in detail later in connection with the drawings.

An authentication server function (AUSF) 151 may provide a service for a subscriber authentication process.

A network exposure function (NEF) 152 may access information for managing the UE 120 in the 5G network, subscribe to a mobility management event of the UE 120, subscribe to a session management event of the UE 120, request session-related information, set charging information of the UE 120, request a change in PDU session policy for the UE 120, and transmit a small amount of data for the UE 120.

A network repository function (NRF) 153 may store status information of NFs and process requests for finding NFs that may be accessed by other NFs.

A policy and charging function (PCF) 154 may apply a service policy of a mobile network operator, a charging policy, and a policy for a PDU session for the UE 120.

A unified data management (UDM) 155 may store information about a subscriber and/or the UE 120.

An application function (AF) 156 may provide a service to users by interworking with a mobile communication network.

A service communication proxy (SCP) 157 may provide functions such as discovering an NF for communication between NFs, transmitting messages between NFs, or the like. The SCP 157 may be operated in an integrated form with the NRF 153 according to a selection of an operator, and in this case, the SCP 157 may include a function of the NRF 153, or conversely, the NRF 153 may include a function of the SCP 157.

Entities that exchange information for access control and status management will now be collectively called "NFs" for convenience of explanation. For example, an NF may include one of an AMF, an SMF, an NSSF, or the like. Embodiments of the disclosure may be equally applied to an occasion when the NF is implemented as an instance, e.g., an AMF instance, an SMF instance, an NSSF instance, etc.

In a network, coping with various situations that occur during actual operation of an NF, and recovery without service impact in the event of a problem is a necessary function. In the disclosure, a group of NFs that provide the same function/services are defined as an NF set, and a method for adaptively coping with a change in situation of the network (generation of a new NF, termination of an existing NF, an NF fault, etc.) is provided. Although the disclosure does not specify an NF service set that bundles an NF service provided by an NF and equivalent NF services, the main gist of the disclosure may be equally applied to not only the NF set but also the NF service set.

In an embodiment, the NF set may be mapped with a UPF on a network in a ratio of N:M (N≥1, M≥1). In addition, an NF may include a control plane entity including such as an AMF, an SMF, or the like.

Figure 2:
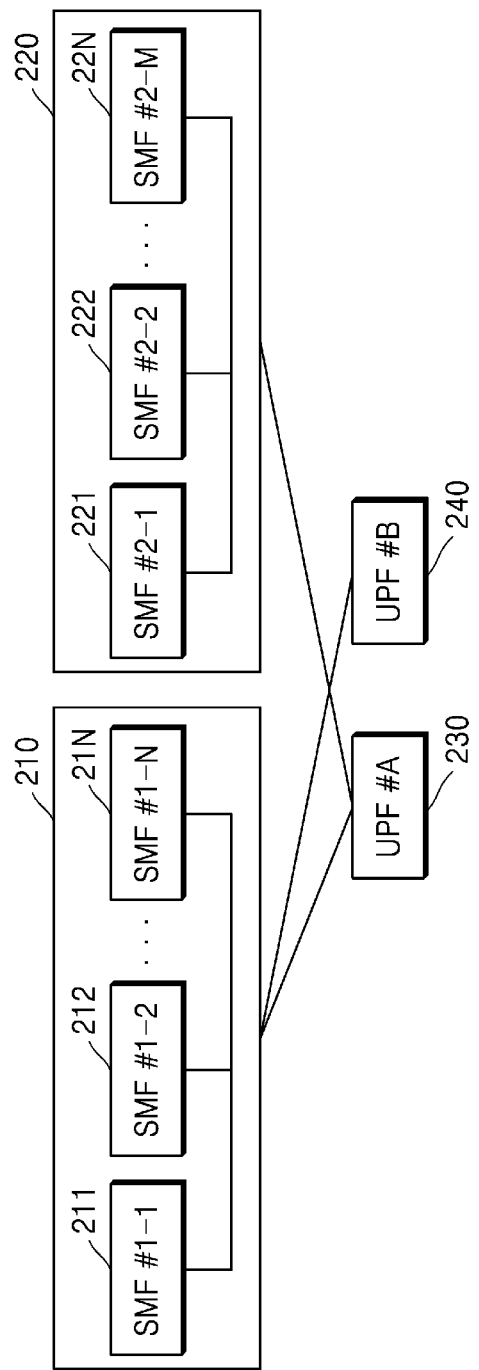
FIG. 2 is a diagram illustrating an association relationship between a session management function (SMF) and a user plane function (UPF) according to an embodiment of the disclosure.

FIG. 2 is a diagram illustrating an association relationship between an SMF and a UPF according to an embodiment of the disclosure.

In FIG. 2, an SMF is described as an example of an NF. In FIG. 2, two SMF sets, e.g., a set #1 210 and a set #2 220, are shown, where N SMF instances 212, 212, and 21N are included in the SMF set #1 210, and M SMF instances 221, 222, and 22N are included in the SMF set #2 220. In FIG. 2, each of two UPFs, e.g., a UPF #A 230 and a UPF #B 240, is interlocked with the SMF set #1 210, the SMF set #2 220, and SMF instances of the SMF set #1 210. In other words, an SMF set and a UPF may freely have an association relationship with each other.

A configuration of an SMF set, instances included in the SMF set, and an association relationship with a UPF may all be dynamically changed according to a network situation and operation needs. When an SMF set is changed in a network, it may be roughly divided into two types. The first is a case in which the SMF set itself of the network is newly created, the set disappears, or information of the set (set ID, etc.) is changed. The second is when set information of an SMF instance is changed. Changing of the set information may include all additions, deletions, updates of SMF instances.

Figure 3:
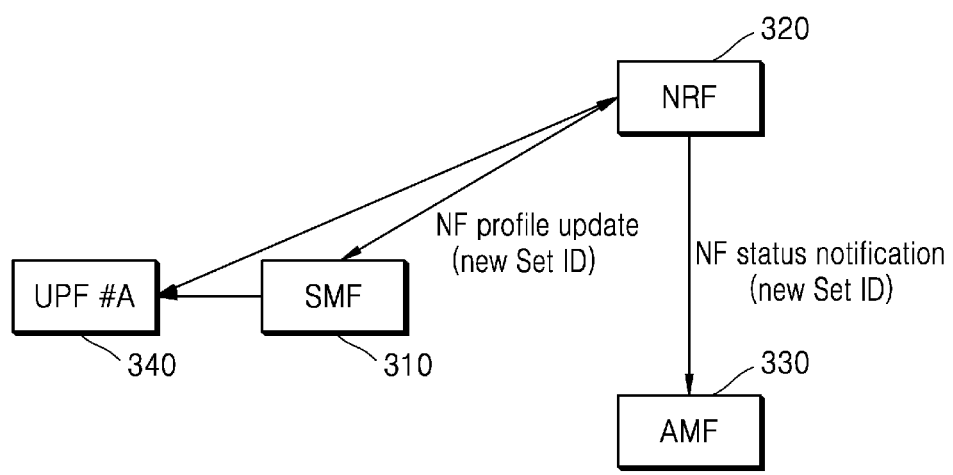
FIG. 3 is a diagram illustrating a network operation when set information of an SMF is changed, according to an embodiment of the disclosure.

FIG. 3 is a diagram illustrating a network operation when set information of an SMF is changed, according to an embodiment of the disclosure.

When a set configuration of an SMF 310 is changed, in an embodiment of the disclosure, the SMF 310 may transfer the changed information to another NF (for example, an AMF 330) through an NRF 320. In other words, the SMF 310 may notify the NRF 320 of its changed set information. This procedure is performed through a procedure of newly registering an NF profile including the set information of the SMF 310 or changing/updating an existing NF profile. The NRF 320 may notify the other NF of the changed SMF information. In an embodiment, when a UPF 340 is interlocked with the NRF 320, the UPF 340 may receive a notification. However, when the UPF 340 is not interlocked with the NRF 320, it is difficult for the UPF 340 to receive a notification.

Figure 4:
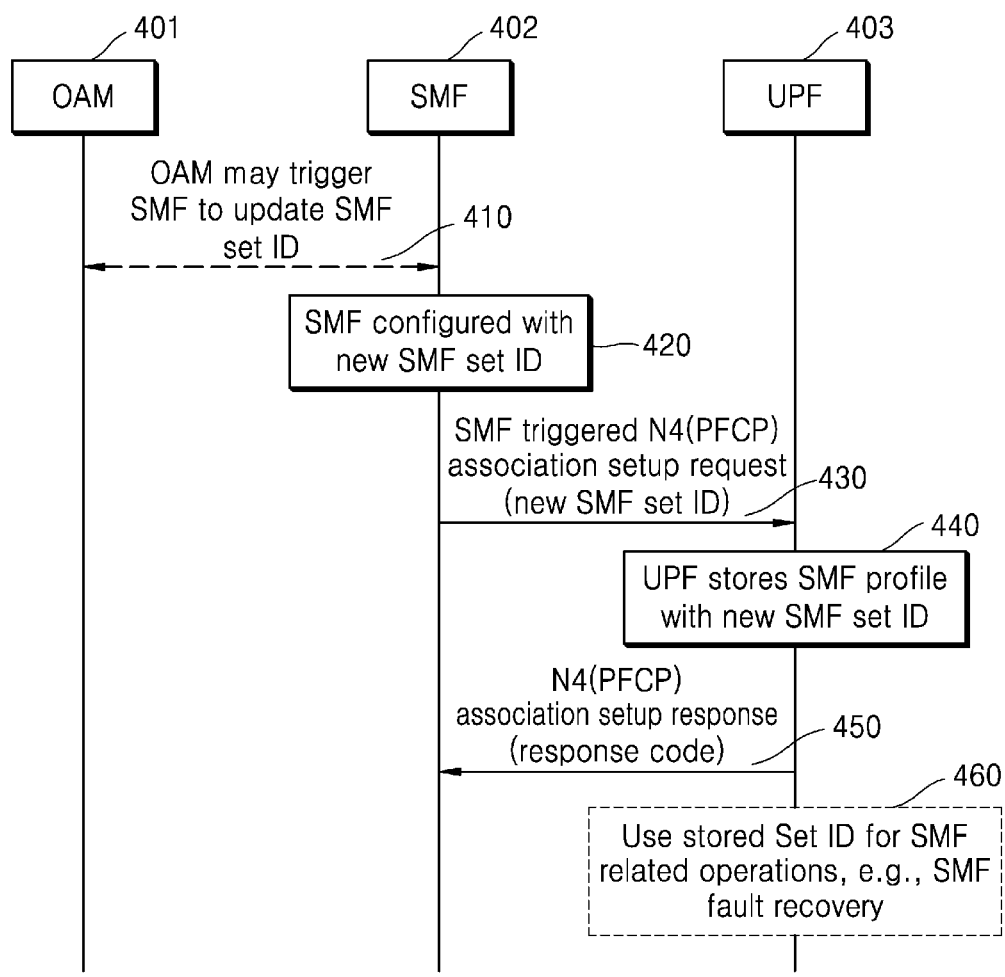
FIG. 4 is a diagram illustrating a network operation using an SMF set according to an embodiment of the disclosure.

FIG. 4 is a diagram illustrating a network operation using an SMF set according to an embodiment of the disclosure.

In operation 410, an SMF 402 may change set information (including a set ID) through an instruction from an operations, administration and maintenance (OAM) 401. This indication from the OAM 401 may be automatically performed when an operator command is input or a condition is satisfied. When the OAM 401 and the SMF 402 are separated from each other, the OAM 401 may transmit, to the SMF 402, a message including configuration information for the indication from the OAM 401, and receive a response thereto.

In operation 420, new SMF set information (including a set ID) is configured in the SMF 402.

In operation 430, the SMF 402 transmits, to the UPF 403, an association setup request message for generating an N4 (packet forwarding control protocol (PFCP)) association to a UPF 403, to transmit the SMF set information to the UPF 403. When it is necessary for the SMF 402 to limit or select the target UPF 403 to be operated according to an SMF set configured by the SMF 402, the SMF 402 may perform an operation for selecting the target UPF 403. To this end, the SMF 402 may use information such as an SMF set ID, a slice ID (single-network slice selection assistance information (S-NSSAI)), and a data network name (DNN). When there is an N4 (PCFP) association that the SMF 402 has established with the target UPF 403, and the existing association is not valid due to the change in SMF set, the SMF 402 may transmit, to the UPF 403, a request for releasing the existing association before transmitting an association setup request message for creating new association, and receive a release response thereto. New SMF set information, in particular, a set ID, may be included in the association setup request message for creating new association. In addition, the information transmitted from the SMF 402 may include a timer value, and the timer value may be used to inform a time at which the SMF 402, from which the request has been made, starts operating with a new SMF set ID.

In operation 440, the UPF 403 may obtain the SMF set information, in particular, the SMF set ID, through the message received from the SMF 402, and store the obtained SMF set information as information of the corresponding SMF 402. The UPF 403 may store and use the obtained information in units of SMF (that is, units of SMF instance), or may store and use the information in units of currently processed N4 (PFCP) association. When a timer value is included in the received message, the UPF 403 starts a timer based on the timer value, and determines that the corresponding SMF 402 operates a new set from when the timer has expired.

In operation 450, the UPF 403 generates an N4 (PCFP) association through the message received from the SMF 402, and transmits an association setup response message in response thereto.

In operation 460, the UPF 403 performs an operation that uses the stored SMF set information. In other words, when two or more SMF instances are included in the SMF set, the UPF 403 may perform an operational operation, a session processing request/notification, or a fault recovery process using the same. For example, when a transaction with an SMF set is required, the UPF 403 may select and process one available from among the SMF instances included in the SMF set. Alternatively, regarding a transaction to be processed with respect to an SMF instance, when the corresponding SMF instance does not respond or is unable to receive a request due to fault and/or overload, and it is necessary to select another SMF instance, the UPF 403 may select another SMF instance by using an SMF set ID of the corresponding SMF instance.

Figure 5:
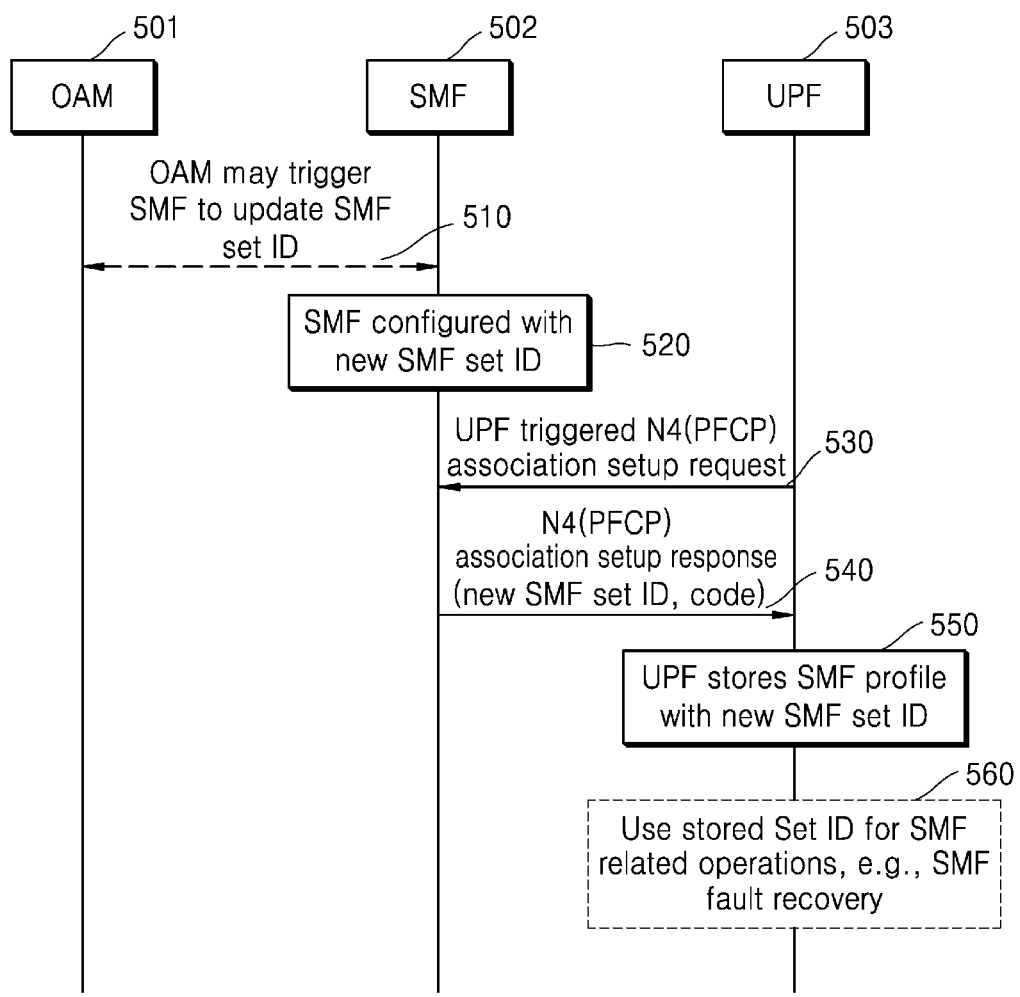
FIG. 5 is a diagram illustrating a network operation using an SMF set according to another embodiment of the disclosure.

FIG. 5 is a diagram illustrating a network operation using an SMF set according to another embodiment of the disclosure.

In operation 510, an SMF 502 may change set information (including a set ID) through an indication from an OAM 501. This indication from the OAM 501 may be performed by a function configured to be automatically performed when an operator command is input or a condition is satisfied. When the OAM 501 and the SMF 502 are separated from each other, the OAM 501 may transmit, to the SMF 502, a message including configuration information for the indication from the OAM 501, and receive a response thereto.

In operation 520, new SMF set information (including a set ID) is configured in the SMF 502.

In operation 530, a UPF 503 transmits, to the SMF 502, an association setup request message for creating an N4 (PFCP) association by a certain condition. The transmission condition may include recognizing that a new UPF is created, the UPF 503 is restarted, or the SMF configuration has been changed, or that an SMF instance and an existing N4 (PCFP) association are released and a new association is required. The UPF 503 may include service information (a slice identifier, a DNN, etc.) supported by the UPF 503 in the association setup request message.

In operation 540, the SMF 502 transmits an association setup response message to the UPF 503, and SMF set information (including an SMF set ID) is included in the association setup response message. In this case, when the SMF 502 may select an SMF set to be included in the association setup response message (that is, when the SMF instance supports at least two sets), the SMF 502 may use information such as a slice ID (S-NSSAI), a DNN, or the like. When the SMF 502 has previously established an N4 (PCFP) association with the target UPF and the existing association is not valid due to a change in SMF set, before the association setup response message for creating a new association is transmitted, the SMF 502 may transmit a request for releasing the existing association to the UPF 503, and receive a release response in response thereto. New SMF set information, in particular, a set ID, may be included in the association setup response message for creating a new association. In addition, the set information of the response message transmitted from the SMF 502 may include a timer value, and the timer value may be used to notify the UPF 503 of a time at which the SMF 502, which transmits the response, starts operating with the new SMF set ID.

Table 1 shows a message format for transmitting an N4 (PFCP) association setup response message including an SMF set ID. This information may be included in the message and transmitted along with an ID of an NF transmitting the message and information indicating a reason of transmission.

TABLE 1

| Information elements | P | Condition/Comment | IE Type |
|---|---|---|---|
| Node ID | NA | This IE shall contain the unique identifier of the sending Node. | Node ID |
| Cause | M | This IE shall indicate the acceptance or the rejection of the corresponding request message. | Cause |

TABLE 1-continued

| Information elements | P | Condition/Comment | IE Type |
|---|---|---|---|
| CP Function Features | C | This IE shall be present if the CP function sends this message and the CP function supports at least one CP feature defined in this IE. When present, this IE indicates the features the CP function supports. | CP Function Features |
| SMF Set ID | C | This IE shall be present if the CP function sends this message and SMF advertises the support of the MPAS (Multiple PFCP Associations to the SMFs in an SMF set) feature in the CP Function Features IE. When present, this IE shall contain an FQDN representing the SMF set to which the SMF belongs. | SMF Set ID |

In operation 550, the UPF 503 may obtain the set information, in particular, the SMF set ID, of the SMF 502 through the message received from the SMF 502, and store the obtained set information as information of the corresponding SMF. The UPF 503 may store and use the obtained information in units of SMF (that is, units of SMF instance) or in units of currently processed N4 (PFCP) association. When a timer value is included in the received message, the UPF 503 starts a timer based on the timer value, and determines that the SMF 502 is operated with the new set after expiry of the timer.

In operation 560, the UPF 503 performs an operation using the stored SMF set information. In other words, when two or more SMF instances are included in the SMF set, the UPF 503 may perform an operational operation, a session processing request/notification, and a failure recovery process using the same. For example, when a transaction with respect to the SMF set is required, the UPF 503 may select and process an available one from among SMF instances belonging to the SMF set. Alternatively, regarding a transaction to be processed with respect to an SMF instance, when the corresponding SMF instance does not respond or does not receive a request due to a fault and/or an overload, another SMF instance may be selected by using an SMF set ID of the corresponding SMF instance.

Figure 6:
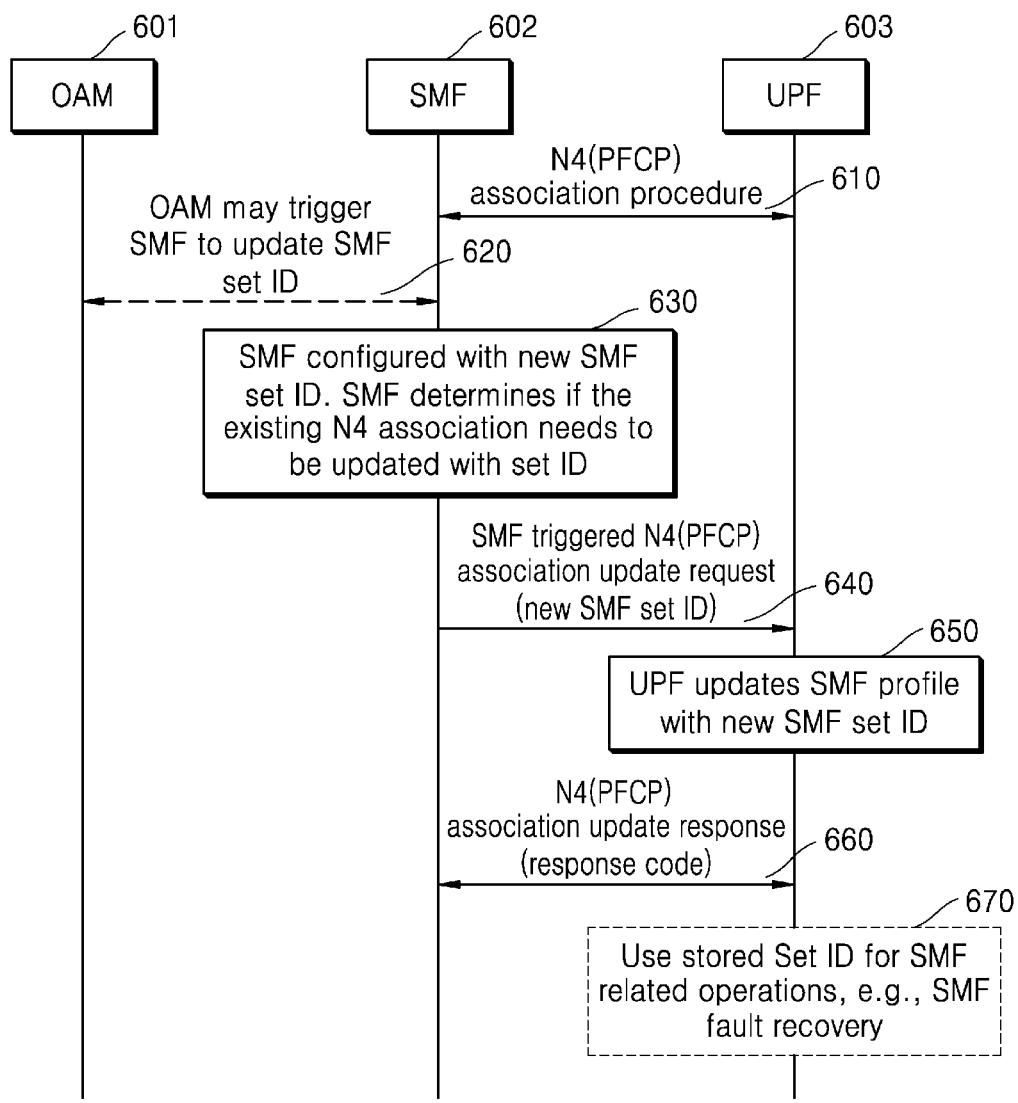
FIG. 6 is a diagram illustrating a network operation using an SMF set according to another embodiment of the disclosure.

FIG. 6 is a diagram illustrating a network operation using an SMF set according to another embodiment of the disclosure.

In operation 610, an SMF 602 and a UPF 603 are operated by creating an N4 (PFCP) association with each other.

In operation 620, the SMF 602 may change set information (including a set ID) through an indication from an OAM 601. This indication from the OAM 601 may be performed by a function configured to be automatically performed when an operator command is input or a condition is satisfied. When the OAM 601 and the SMF 602 are separated from each other, the OAM 601 may transmit, to the SMF 602, a message including configuration information for changing the set ID, and receive a response thereto.

In operation 630, the SMF 602 is configured with new SMF set information (including a set ID). For this reason, the SMF 602 determines that the N4 (PCFP) association established with the existing UPF 603 needs to be updated. When it is necessary for the SMF 602 to limit or select the target UPF 603 to be operated according to an SMF set configured by the SMF 602, the SMF 602 may perform an operation for selecting the target UPF 603. To this end, the SMF 602 may use information such as an SMF set ID, a slice ID (S-NSSAI), a DNN, or the like.

In operation 640, the SMF 602 transmits an N4 (PFCP) association update request message to the UPF 603 to update the SMF set information with the UPF 603. New SMF set information, in particular, a set ID, may be included in the association update request message. In addition, the information transmitted from the SMF 602 may include a time value, and this timer value may be used to inform a time at which the SMF 602, from which the request has been made, starts operating with the new SMF set ID.

Table 2 shows a message format for transmitting an N4 (PFCP) association update request message including an SMF set ID. This information may be included in the message and transmitted along with information indicating an ID of an NF transmitting the message and a reason of transmission.

TABLE 2

| Information elements | P | Condition/Comment | IE Type |
|---|---|---|---|
| Node ID | M | This IE shall contain the unique identifier of the sending Node. | Node ID |
| CP Function Features | O | If present, this IE shall indicate the supported Features when the sending node is the CP function. | CP Function Features |
| SMF Set ID | O | This IE may be present if the CP function sends this message and SMF advertises the support of the MPAS feature in the CP Function Features IE, and there is a change in FQDN representing the SMF set to which the SMF belongs. | SMF Set ID |

In operation 650, the UPF 603 obtain the set information of the SMF 602 and update the obtained set information as information of the corresponding SMF 602 through the message received from the SMF 602, and may obtain and store, in particular, an SMF set ID. The UPF 603 may store and use the obtained information in units of SMF (that is, units of SMF instance) or units of currently processed N4 (PFCP) association. When a timer value is included in the received message, the UPF 603 starts a timer, and determines that the corresponding SMF 602 operates a new set after expiry of the timer.

In operation 660, the UPF 603 may update the N4 (PCFP) association through the message received from the SMF 602, and transmit a response thereto.

In operation 670, the UPF 603 performs an operation using the stored SMF set information. In other words, when two or more SMF instances are included in the SMF set, the UPF 603 may perform an operational operation, a session processing request/notification, and a fault recovery process using the same. For example, when a transaction with an SMF set is required, the UPF 603 may select and process an available one from among SMF instances belonging to the SMF set. Alternatively, regarding a transaction to be processed with respect to an SMF instance, when the corresponding SMF instance does not respond or does not receive a request due to a fault and/or an overload, another SMF instance may be selected by using an SMF set ID of the corresponding SMF instance.

Although it is described above that the SMF 602 triggers an N4 (PFCP) association update process, the embodiment may be similarly applied when the UPF 603 starts the N4 (PFCP) association update process. In this case, the UPF 603 transmits an update request to the SMF 602, and when the SMF 602 determines that it is necessary to update set information of the corresponding UPF 603, the SMF 602 may insert the changed set information (including a set ID) in an update response message and transmit the message. An operation of the UPF using the above is as described above.

Figure 7:
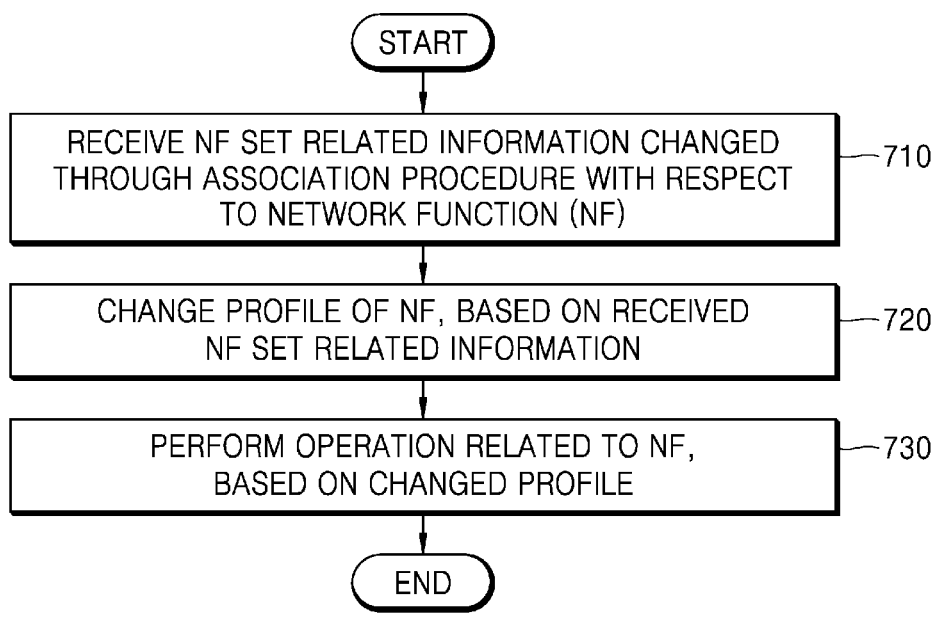
FIG. 7 is a flowchart of an operation of a UPF according to an embodiment of the disclosure.

FIG. 7 is a flowchart of an operation of a UPF according to an embodiment of the disclosure.

Referring to FIG. 7, in operation 710, the UPF may receive NF set related information changed through an association procedure with an NF.

In an embodiment, the UPF may receive, from the NF, an association request including NF set related information to be changed, and transmit an association response for the association request to the NF, thereby receiving the NF set related information to be changed. In addition, the UPF may transmit the association request to the NF and receive, from the NF, an association response for the association request including NF set related information to be changed, thereby receiving the NF set related information to be changed. Furthermore, when an association procedure with the NF has already been performed, the UFP may receive, from the NF, an association update request including NF set related information to be changed, and transmit an association update response for the association update request to the NF, thereby receiving the NF set related information to be changed.

In an embodiment, indication information for indicating to change an NF set may include an NF set ID. Furthermore, the NF set related information may further include a timer value for operating the NF with the changed NF set.

In an embodiment, the NF may include an SMF, an AMF, etc.

In operation 720, the UPF may change a profile of the NF, based on the received NF set related information. The UPF may obtain NF set information from the NF, and store the obtained NF set information as information of the corresponding NF. For example, an NF set ID may be obtained and stored. The UPF may store and use the obtained information in units of NF (that is, units of NF instance) or units of currently processed N4 (PFCP).

In operation 730, the UPF may perform an operation related to the NF, based on the changed profile. In an embodiment, the UPF may perform an operation such as session processing, notification, or fault recovery. Furthermore, when the NF set related information includes a timer value for operating the NF with the changed NF set, the UPF may start the timer based on the timer value, and when the timer has expired, may perform the operation related to the NF.

Figure 8:
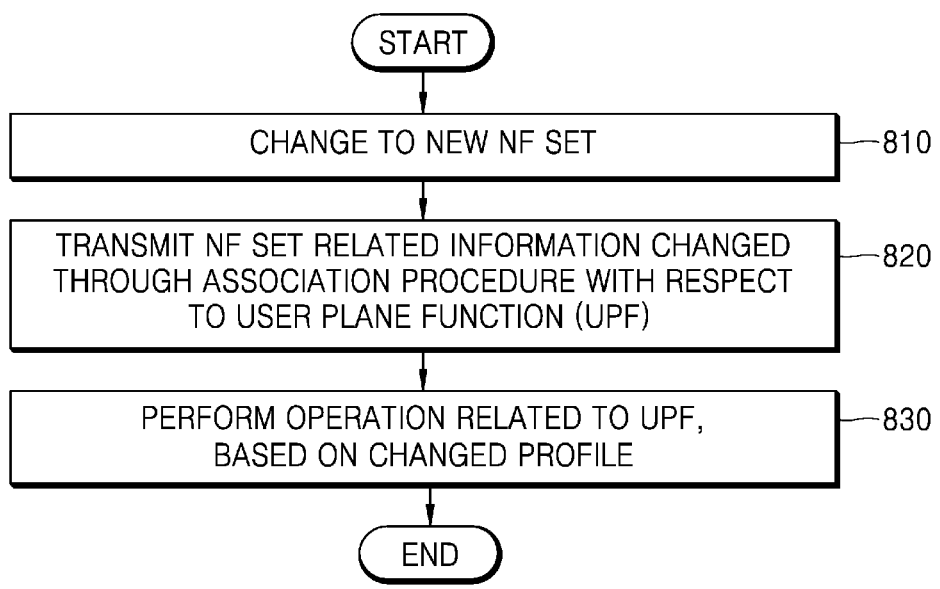
FIG. 8 is a flowchart of an operation of a network function (NF) according to an embodiment of the disclosure.

FIG. 8 is a flowchart of an operation of an NF according to an embodiment of the disclosure.

Referring to FIG. 8, in operation 810, the NF may be changed to a new NF set. In an embodiment, the NF may change set information according to a configuration or an indication from an OAM.

In operation 820, the NF may transmit NF set related information to be changed through an association procedure with the UPF. In an embodiment, the NF may transmit, to the UPF, an association request including NF set related information to be changed, and transmit an association response for the association request from the UPF, thereby transmitting the NF set related information to be changed. In addition, the NF may receive the association request from the UPF and transmit, to the NF, an association response for the association request including NF set related information to be changed, thereby transmitting the NF set related information to be changed. Furthermore, when an association procedure with the UPF has already been performed, the NF may transmit, to the UPF, an association update request including NF set related information to be changed, and receive an association update response for the association update request from the UPF, thereby transmitting the NF set related information to be changed.

In an embodiment, indication information for indicating to change an NF set may include an NF set ID. Furthermore, the NF set related information may further include a timer value for operating the NF with the changed NF set.

In operation 830, the NF may perform an operation related to the UPF, based on the changed profile. In an embodiment, the NF may perform an operation such as session processing, notification, or fault recovery.

Figure 9:
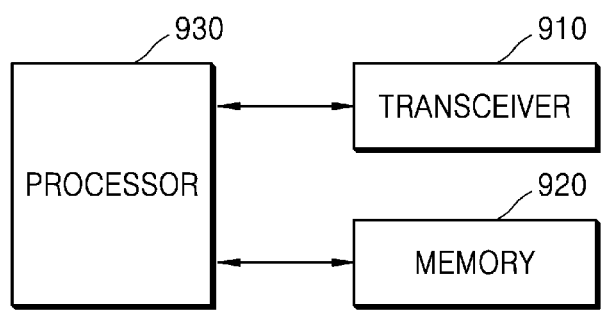
FIG. 9 is an apparatus diagram illustrating a configuration of an NF according to an embodiment of the disclosure.

FIG. 9 is a diagram illustrating a configuration of a network entity according to an embodiment of the disclosure.

As shown in FIG. 9, the network entity in the disclosure may include a transceiver 910, a memory 920, and a processor 930. The processor 930, the transceiver 910, and the memory 920 of the network entity may operate according to the aforementioned communication method of the network entity. Components of the network entity are not, however, limited thereto. For example, the network entity may include more or fewer elements than described above. In addition, the processor 930, the transceiver 910, and the memory 920 may be implemented in the form of a chip. The processor 930 may include at least one processor.

In an embodiment, the network entity may include the AMF 131, the UPF 133, the NSSF 134, the AUSF 151, the NEF 152, the PCF 154, the UDM 155, the AF 156, the SCP 157, etc. described with reference to FIG. 1. However, this is only an example, and the network entity may include various entities.

The transceiver 910 is a collective term of a network entity receiver and a network entity transmitter, and may transmit or receive a signal to or from a RAN. The signals transmitted to and received from the RAN may include control information and data. To this end, the transceiver 910 may include an RF transmitter for up-converting the frequency of a signal to be transmitted and amplifying the signal, and an RF receiver for low-noise amplifying a received signal and down-converting the frequency of the received signal. It is merely an example, and the elements of the transceiver 910 are not limited to the RF transmitter and RF receiver.

In addition, the transceiver 910 may receive a signal on a wireless channel and output the signal to the processor 930, or transmit a signal output from the processor 930 on a radio channel.

The memory 920 may store a program and data required for an operation of the network entity. Furthermore, the memory 920 may store control information or data included in a signal obtained by the network entity. The memory 920 may include a storage medium such as a read only memory (ROM), a random access memory (RAM), a hard disk, a compact disc ROM (CD-ROM), and a digital versatile disc (DVD), or a combination of storage mediums.

The processor 930 may control a series of processes for the network entity to be operated according to the embodiments of the disclosure. For example, the processor 930 may receive a control signal and a data signal through the transceiver 910, and process the received control signal and the received data signal. In addition, the processor 930 may transmit the processed control signal and the processed data signal through the transceiver 910.

The methods according to the embodiments of the disclosure, which are described in the claims or the specification, may be implemented as hardware, software, or a combination of hardware and software.

When implemented as software, a computer-readable storage medium storing one or more programs (software modules) may be provided. One or more programs stored in the computer-readable storage medium are configured to be executable by one or more processors in an electronic device. One or more programs include instructions that cause the electronic device to execute the methods according to the embodiments of the disclosure, which are described in the claims or the specification of the disclosure.

The programs (e.g., software modules or software) may be stored in non-volatile memory including RAM or flash memory, ROM, electrically erasable programmable read only memory (EEPROM), a magnetic disc storage device, a CD-ROM, a DVD, another optical storage device, or a magnetic cassette. Alternatively, one or more programs may be stored in a memory provided by a combination of all or part of these devices. In addition, each memory may include a plurality of configured memories.

In addition, the programs may be stored in an attachable storage device accessible through any or a combination of communication networks such as Internet, an intranet, a local area network (LAN), a wide area network (WAN), a storage area network (SAN), or the like. These storage devices may be connected through an external port to a device that performs the embodiments of the disclosure. In addition, a separate storage on the communication network may access the device that performs the embodiment of the disclosure.

In the above particular embodiments of the disclosure, the components included in the disclosure are expressed in the singular or plural according to the presented particular embodiments of the disclosure. However, the expression in the singular or plural form is appropriately selected according to the suggested situations for convenience of explanation and is not intended to limit the disclosure to the single or plural elements. Even when a certain element is expressed in the plural form, it may be provided with a single element, and even when a certain element is expressed in the singular form, it may be provided with a plurality of elements.

Although specific embodiments have been described in the detailed description of the disclosure, various modifications may be made without departing from the scope of the disclosure. Therefore, the scope of the disclosure should not be limited to the above-described embodiments of the disclosure and should be determined by the appended claims and the equivalents thereof.

According to an embodiment of the disclosure, the reliability of a wireless communication system may increase.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of a user plane function (UPF) in a wireless communication system, the method comprising:
   transmitting, to a network function (NF), a packet forwarding control protocol (PFCP) association setup request;
   receiving, from the NF, a PFCP association setup response including session management function (SMF) set related information corresponding to the association setup request; and
   performing an operation related to a PFCP session with the NF based on the SMF set related information.

2. The method of claim 1, the method further comprising:
   transmitting, to the NF, a PFCP association update request; and
   receiving, from the NF, a PFCP association update response corresponding to the association update request.

3. The method of claim 1, the method further comprising:
   receiving, from the NF, a PFCP association update request including changed SMF set related information; and
   transmitting, to the NF, a PFCP association update response corresponding to the association update request.

4. The method of claim 1, wherein the SMF set related information comprises an SMF set identification (ID).

5. The method of claim 4, wherein an SMF instance for the SMF set ID is determined based on at least one of slice information of the SMF instance and network name of the SMF instance.

6. The method of claim 1, wherein the NF comprises at least one of an access and mobility management function (AMF) or a session management function (SMF).

7. The method of claim 1, wherein the transmitting to the NF, the PFCP association setup request comprises:
   identifying a condition for transmitting the PFCP association setup request, and
   wherein the condition includes at least one of creation of a UPF, restart of a UPF, change of configuration related to the NF, and release of existing PFCP association.

8. The method of claim 1, the method further comprising:
   identifying an existing PFCP association with the NF is available; and
   in case that the existing PFCP association is not available:
   transmitting, to the NF, a PFCP association release request; and
   receiving, from the NF, a PFCP association release response.

9. The method of claim 1, the method further comprising:
   selecting an SMF instance included in an SMF set based on the SMF set related information.

10. A user plane function (UPF) in a wireless communication system, the UPF comprising:
    a transceiver;
    memory; and
    a processor operably connected to the transceiver and the memory, the processor configured to:
    transmit, to a network function (NF), a packet forwarding control protocol (PFCP) association setup request;
    receive, from the NF, a PFCP association setup response including session management function (SMF) set related information corresponding to the association setup request; and
    perform an operation related to a PFCP session with the NF based on the SMF set related information.

11. The UPF of claim 10, wherein the transceiver is further configured to:
    transmit, to the NF, a PFCP association update request, and
    receive, from the NF, a PFCP association update response corresponding to the association update request.

12. The UPF of claim 10, wherein:
    the transceiver is further configured to:
    receive, from the NF, a PFCP association update request including changed SMF NF set related information, and
    transmit, to the NF, a PFCP association update response corresponding to the association update request.

13. The UPF of claim 10, wherein the SMF set related information comprises an SMF set identification (ID).

14. The UPF of claim 13, wherein an SMF instance for the SMF set ID is determined based on at least one of slice information of the SMF instance and network name of the SMF instance.

15. The UPF of claim 10, wherein the NF comprises at least one of an access and mobility management function (AMF) or a session management function (SMF).

16. The UPF of claim 10, wherein the processor is further configured to:
   identify a condition for transmitting the PFCP association setup request, and
   wherein the condition includes at least one of creation of a UPF, restart of a UPF, change of configuration related to the NF, and release of existing PFCP association.

17. The UPF of claim 10, wherein the processor is further configured to:
   identify an existing PFCP association with the NF is available, and
   in case that the existing PFCP association is not available, the transceiver is further configured to:
      transmit, to the NF, a PFCP association release request; and
      receive, from the NF, a PFCP association release response.

18. The UPF of claim 10, wherein the processor is further configured to:
   select an SMF instance included in an SMF set based on the SMF set related information.

* * * * *